US012700102B2

(12) United States Patent
Ko

(10) Patent No.: US 12,700,102 B2
(45) Date of Patent: Aug. 4, 2026

(54) METHOD AND SYSTEM FOR PLY BOUNDARY DETECTION

(71) Applicant: The Boeing Company, Arlington, VA (US)

(72) Inventor: William Ko, Melbourne (AU)

(73) Assignee: The Boeing Company, Arlington, VA (US)

( * ) Notice: Subject to any disclaimer, the term of this patent is extended or adjusted under 35 U.S.C. 154(b) by 265 days.

(21) Appl. No.: 18/528,381

(22) Filed: Dec. 4, 2023

(65) Prior Publication Data

US 2025/0139784 A1 May 1, 2025

Related U.S. Application Data

(60) Provisional application No. 63/593,134, filed on Oct. 25, 2023.

(51) Int. Cl.
G06T 7/13 (2017.01)
G01B 11/25 (2006.01)

(52) U.S. Cl.
CPC ............ G06T 7/13 (2017.01); G01B 11/2518 (2013.01)

(58) Field of Classification Search
CPC .............................. G06T 7/13; G01B 11/2518
See application file for complete search history.

(56) References Cited

U.S. PATENT DOCUMENTS

| | | | |
|---|---|---|---|
| 5,615,013 A | 3/1997 | Rueb et al. | |
| 6,304,680 B1 | 10/2001 | Blake et al. | |
| 7,117,047 B1 * | 10/2006 | Blake .................... | G06T 7/0006 |
| | | | 700/62 |
| 10,018,570 B2 | 7/2018 | Ingram et al. | |
| 10,255,671 B1 | 4/2019 | Zmijewski et al. | |
| 11,421,987 B2 | 8/2022 | Tapia et al. | |
| 2013/0033596 A1 | 2/2013 | Crothers et al. | |
| 2015/0015701 A1 * | 1/2015 | Yu .......................... | H04N 23/58 |
| | | | 348/136 |
| 2016/0341671 A1 * | 11/2016 | Maass .............. | G05B 19/41875 |
| 2021/0356255 A1 | 11/2021 | Sweers et al. | |
| 2023/0029940 A1 * | 2/2023 | Shapiro .................... | G06T 7/13 |

OTHER PUBLICATIONS

CNC Skills: Origin Points—Part Three: New Techniques, By Tim Celeski, Apr. 26, 2017; (Year: 2017).*
https://www.rapidscan3d.com/products/trackscan-sharp-s-optical-3d-scanning-system?srsltid=AfmBOoo32BIHGLoZ4IUpdktHy24RB5i_T7ucIFJKZs55DNFSIRSuiada (Year: 2023).*
https://www.youtube.com/watch?v=6YC7N3Cd9T0&t=144s, dated Jun. 26, 2023 (Year: 2023).*
Aligned Vision, Laservision, Projection & Automatic Inspection System, Tech Sheet, aligned-vision.com, accessed Nov. 16, 2023, 1 page.

* cited by examiner

*Primary Examiner* — Ming Shui
(74) *Attorney, Agent, or Firm* — Yee & Associates, P.C.

(57) ABSTRACT

A method and system locate boundaries such as an edge of a composite ply using a laser projector and an imaging system that are angularly offset from each other to create parallax allowing a profile of the edge to be detected and measured.

22 Claims, 11 Drawing Sheets

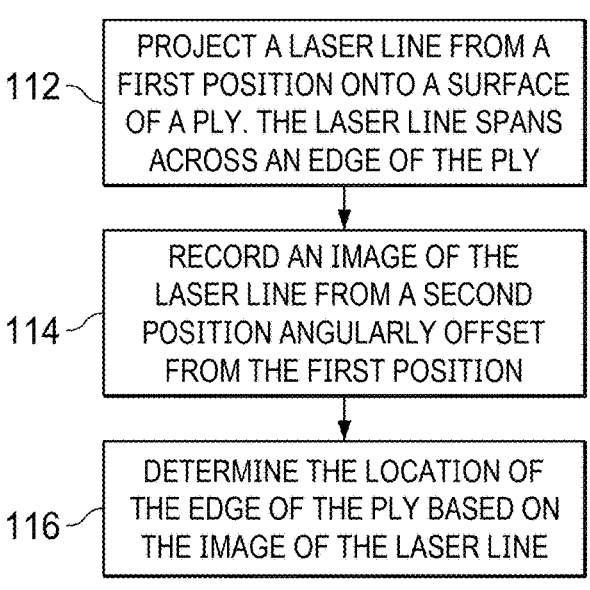

112 ─ PROJECT A LASER LINE FROM A FIRST POSITION ONTO A SURFACE OF A PLY. THE LASER LINE SPANS ACROSS AN EDGE OF THE PLY

114 ─ RECORD AN IMAGE OF THE LASER LINE FROM A SECOND POSITION ANGULARLY OFFSET FROM THE FIRST POSITION

116 ─ DETERMINE THE LOCATION OF THE EDGE OF THE PLY BASED ON THE IMAGE OF THE LASER LINE

FIG. 14

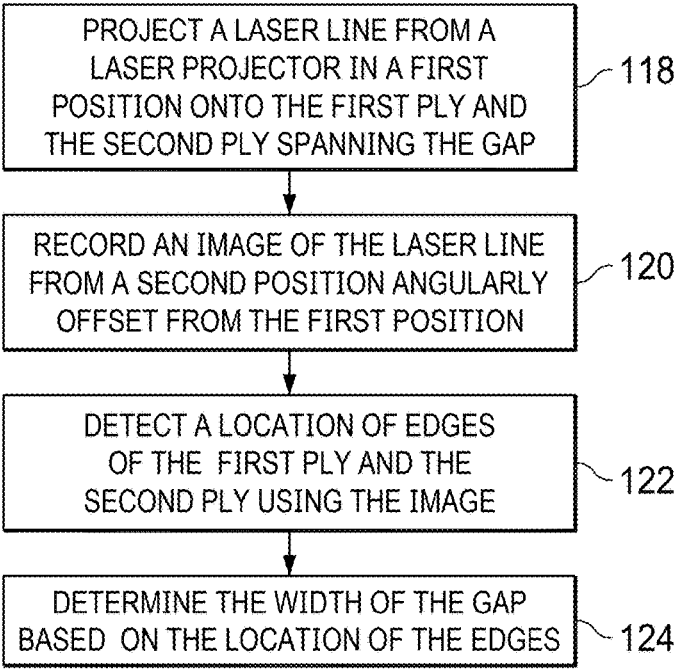

PROJECT A LASER LINE FROM A LASER PROJECTOR IN A FIRST POSITION ONTO THE FIRST PLY AND THE SECOND PLY SPANNING THE GAP ─ 118

RECORD AN IMAGE OF THE LASER LINE FROM A SECOND POSITION ANGULARLY OFFSET FROM THE FIRST POSITION ─ 120

DETECT A LOCATION OF EDGES OF THE FIRST PLY AND THE SECOND PLY USING THE IMAGE ─ 122

DETERMINE THE WIDTH OF THE GAP BASED ON THE LOCATION OF THE EDGES ─ 124

130 — SPECIFICATION AND DESIGN

132 — MATERIAL PROCUREMENT

134 — COMPONENT AND SUBASSEMBLY MANUFACTURING

136 — SYSTEM INTEGRATION

138 — CERTIFICATION AND DELIVERY

140 — IN SERVICE

142 — MAINTENANCE AND SERVICE

128

AIRCRAFT

144 — AIRFRAME     INTERIOR — 148

SYSTEMS

PROPULSION     ELECTRICAL 150   154     152   156

HYDRAULIC     ENVIRONMENTAL

146

METHOD AND SYSTEM FOR PLY BOUNDARY DETECTION

CROSS REFERENCE TO RELATED APPLICATION

This application claims the benefit of U.S. Provisional Patent Application No. 63/593,134 filed Oct. 25, 2023, which is incorporated by reference herein.

BACKGROUND INFORMATION

1. Field

The present disclosure broadly relates to detection of features on surfaces, and deals more particularly with a method and system for detecting ply boundaries and measuring gaps between composite plies.

2. Background

It is sometimes necessary to detect certain boundaries of an object in order to measure gaps or align edges of sheet-like materials. For example, when laying up plies of composite material, it is often important to align the edges of plies in a stack, or to form joints and/or ply ramps. One technique for determining ply boundaries relies on computer vision techniques to detect ply edges, however this approach may be less than fully reliable in some applications where there is reduced contrast between plies, such as when carbon fiber plies overlap and create a black-on-black image. In another technique, a laser profilometer employing a laser scanner is used to detect boundary edges. However, laser scanners have a short range, are relatively slow, particularly when scanning large-scale ply layups, and are less accurate than desired in some applications. Furthermore, in order to detect ply boundaries over larger areas, the laser profilometer must be mounted on a movable platform such as a robot, adding to equipment and maintenance costs.

Accordingly, it would be desirable to provide a method and apparatus for determining ply boundaries more accurately, reliably and over a wider area at higher speeds.

SUMMARY

The disclosure relates in general to fabrication of composite parts, and more specifically to a method and system for determining boundaries of composite plies during ply layup, as well as measuring gaps that may exist between adjacent plies. The disclosed method involves imaging a laser line projected onto the plies that permits locating ply edges by detecting changes in the depth of an image of the laser line. The system comprises a laser projector for projecting a laser line across a wide area spanning two or more plies, and imaging system angularly offset from the laser projector. This angular offset results in parallax that allows ply edges to be viewed in profile, making edge detection more reliable, especially over large areas.

According to one aspect, a method is provided of detecting edges of a ply. The method includes projecting a laser line from a first position onto a surface of a ply and spanning across an edge of the ply. The method also includes recording an image of the laser line from a second position angularly offset from the first position. The method also includes determining the location of the edge of the ply based on the image of the laser line.

According to another aspect, a method is provided of measuring a gap between first and second plies. The method includes projecting a laser line from a laser projector in a first position onto the first ply and the second ply spanning the gap. The method also includes recording an image of the laser line from the second position angularly offset from the first position and detecting a location of the edges of the first ply and second ply using the image. The method also includes determining the width of the gap based on the location of the edges According to still another aspect, a system is provided for detecting the location of edges of the ply. The system comprises a laser projector configured to project a laser line onto the ply, and an imaging system angularly offset from the laser projector by an angle that creates parallax.

One of the advantages of the disclosed embodiments is that is that boundaries such edges of the ply can be quickly and easily detected, especially over large areas. Another advantage is that the equipment used in the method is relatively simple. A further advantage is that the equipment can be fixed in place, avoiding the need for movable platform mounting. Still another advantage is that the method permits generation of edge depth information that can be used to improve the accuracy and reliability of ply edge detection.

The features, functions, and advantages can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and advantages thereof, will best be understood by reference to the following detailed description of an illustrative examples of the present disclosure when read in conjunction with the accompanying drawings, wherein:

US 12,700,102 B2

3

Figure 11:
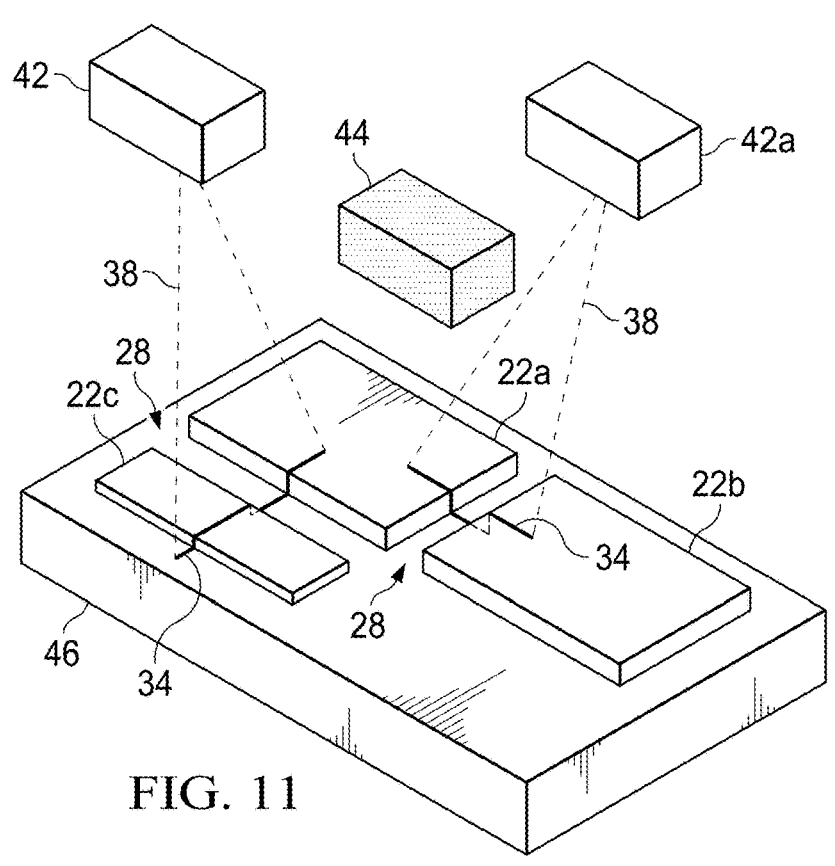

FIG. 11 is an illustration of a diagrammatic, perspective view of system for detecting boundaries and measuring gaps between the edges of multiple plies.

Figure 12:
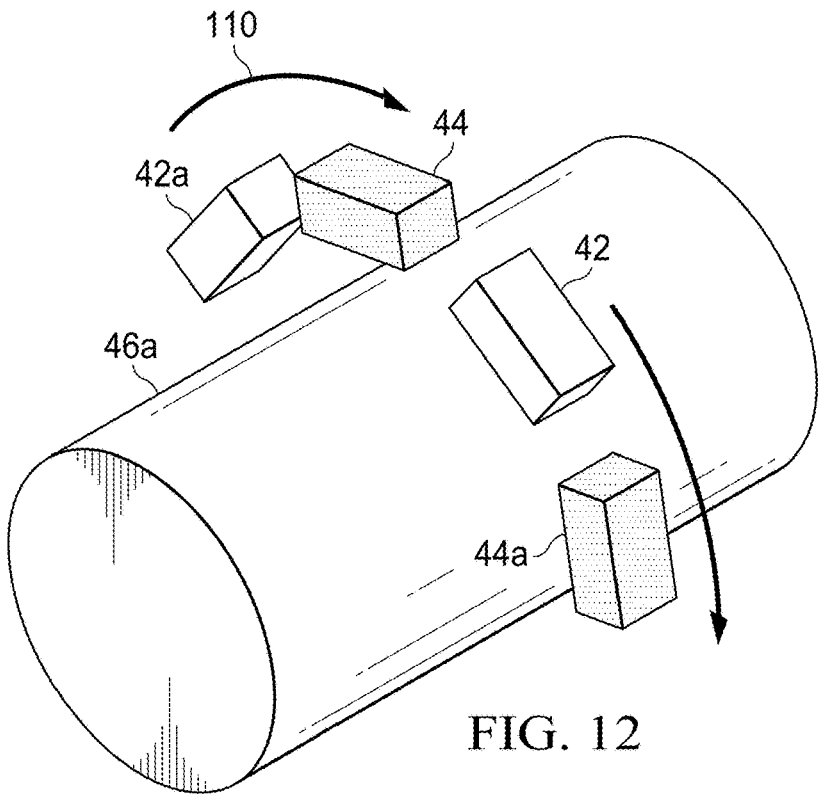

FIG. 12 is an illustration of a diagrammatic, perspective view showing how the system can detect ply boundaries and measure gaps between plies on a curved surface.

Figure 13:
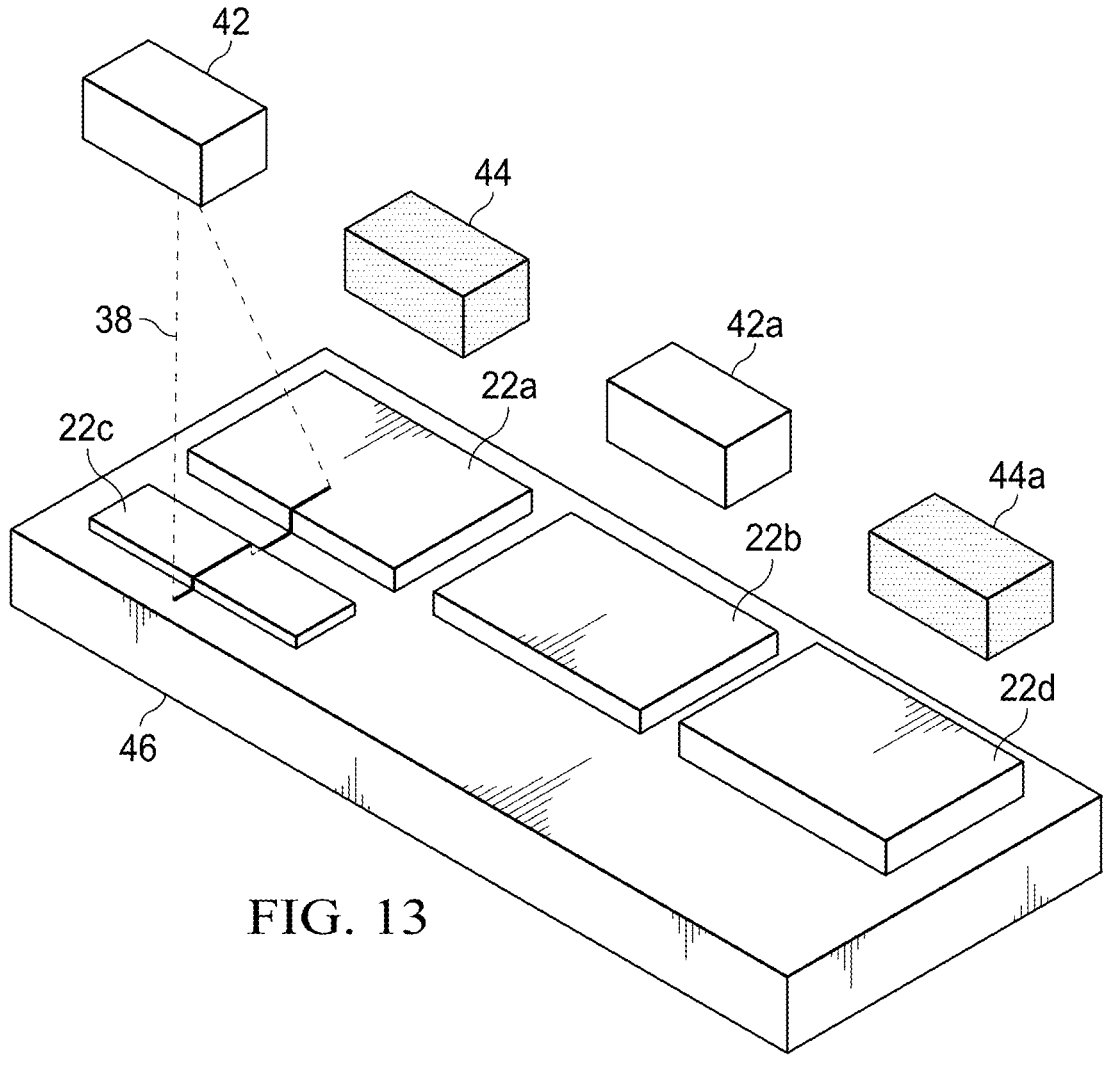

FIG. 13 is an illustration of a diagrammatic, perspective view showing how multiple systems can be used to detect ply boundaries and measure gaps between plies.

FIG. 14 is an illustration of a flow diagram of a method of detecting ply boundaries.

FIG. 15 is an illustration of a flow diagram of a method of measuring gaps between plies.

Figure 16:
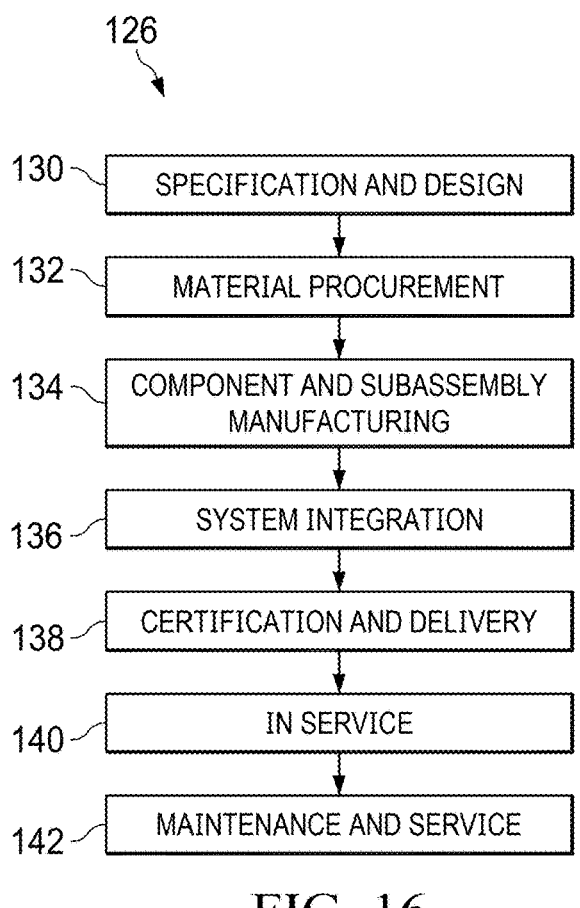

FIG. 16 is an illustration of a flow diagram of aircraft production and service methodology.

Figure 17:
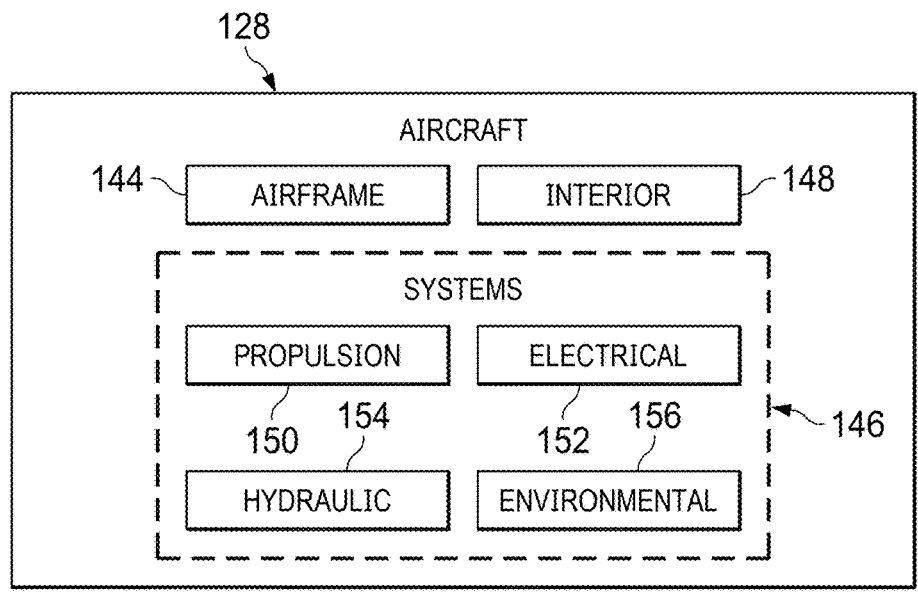

FIG. 17 is an illustration of a block diagram of an aircraft.

DETAILED DESCRIPTION

Figure 1:
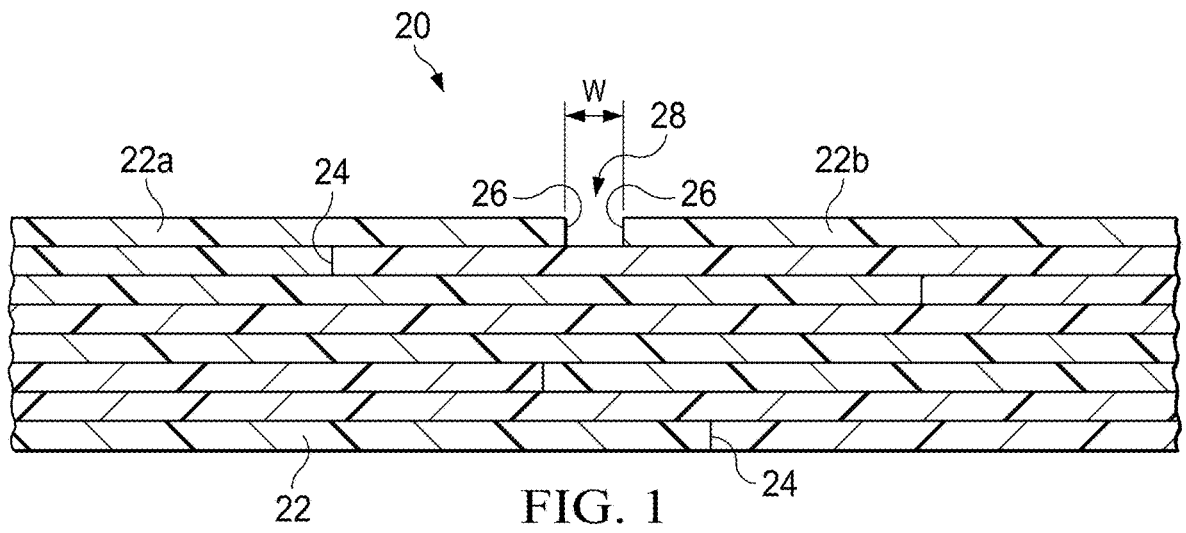
FIG. 1 is an illustration of a cross-sectional view of a ply layup showing a gap between the edges of two plies.

Referring first to FIG. 1, a layup 20, sometimes referred to as a ply stack, comprises multiple plies 22 of composite material, such as, without limitation, CFRP (carbon fiber reinforced plastic). The plies 22 may be laid up using automated, semi-automated or hand layup techniques. Layups for large scale parts sometimes require that the edges 26 of plies 22 abut 24 or nearly abut each other within specified tolerances in order to meet part performance requirements. Depending upon the type of layup process being used, a gap 28 may be present between edges 26 of plies 22 that are adjacent. In some applications, a gap 28 that is within specified limits may be acceptable. Consequently, it is necessary to measure the width W of any gaps 28 that may be present, and rework the plies 22, and/or modify the layup process in order to reduce the gap W to a value that is within specifications. As will be discussed below in more detail, in order to determine whether the width W of any gaps 28 is outside of specified tolerances, it is necessary to determine the location of edges 26 of plies 22 that are adjacent. As used herein, the terms "edges", and "ply boundaries" refer to edges 26 at the outer periphery of the plies 22, including but not limited to those that are intended to abut 24 each other.

Figure 2:
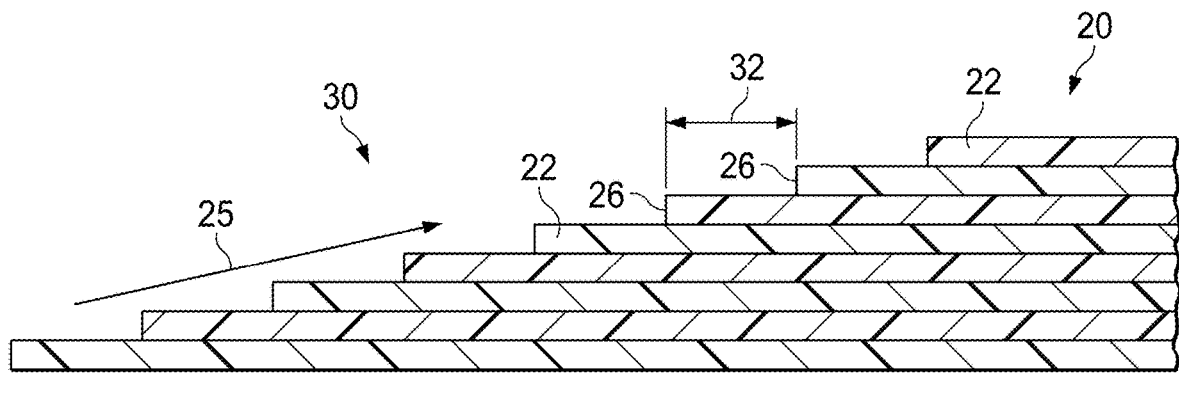
FIG. 2 is an illustration of a cross-sectional view of a ply layup having a ply ramp.
Figures 3, 4:
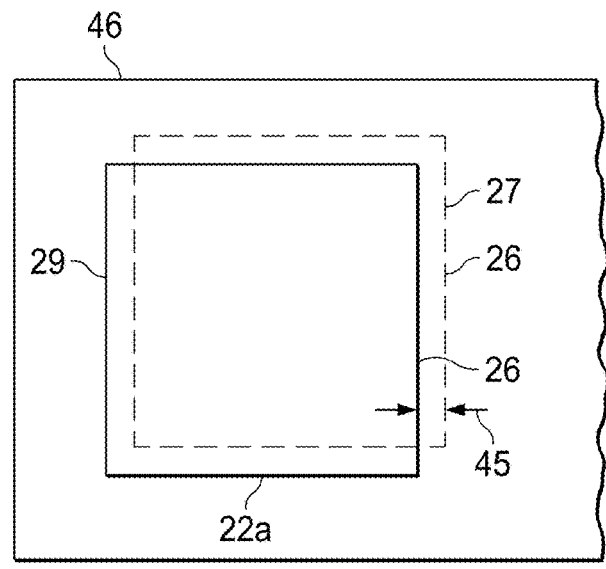
FIG. 3 is an illustration of a fragmentary, top plan view showing nominal and as-laid positions of a ply.
FIG. 4 is an illustration of a perspective view of a system for measuring a gap between two plies.

It may be also necessary in other applications to determine of the location of edges 26 of plies relative to some reference point, such as an edge 26 of an underlying one of the plies 22. For example, referring to FIG. 2, a layup 20 comprises plies 22 with edges 26 that are arranged to form a ramp 30 having a desired ramp rate 25. Similarly, the plies 22 can be arranged to form ply drop-offs (not shown). In order to form the ramp 30, plies 22 in the layup 20 are offset 32 from each other. The offset 32 may be constant or may vary through the depth of the layup 20. During the ply layup process, it may be necessary to verify that an edge of one of the plies 22 is offset 32 a desired distance from an underlying one of the plies 22 by determining the location of the edge 26 of a ply 22 relative to the edge 26 of the underlying ply. Similar to the example described above in connection with FIG. 1, if the distance between detected edges 26 of the plies 22 in adjacent ply layers is not within a desired tolerance, it may be necessary to rework the plies 22 and/or alter the layup process.

Attention is now directed to FIGS. 3-6 which illustrate a method and system 35 for determining the boundaries, and particularly the edges 26, of one or more plies 22. As used herein, the terms "ply" and "plies" refer to any sheet-like materials including but not limited to composite plies such as CFRP. In the illustrated example, two plies 22a, 22b are intended to be laid up on a tool 46 or an underlying ply (not shown) so as to abut 24 (FIG. 1) each other. During the layup process, however, the actual, as-laid position 29 of a ply 22a may be offset 45 from the desired, nominal position 27 (see FIG. 3) resulting in a gap 28 between plies 22a, 22b. It is therefore necessary determine whether the width W of the gap 28 exceeds a tolerance value. In order to determine whether a gap 28 is present between two plies 22a, 22b that exceeds an allowed tolerance, a system 35 is provided for measuring the width W of the gap 28 by locating the edges 26 of the plies 22a, 22b and determining the distance between edges 26 that are adjacent to each other. As will be discussed later in more detail, locating the edges 26 of the plies 22a, 22b involves analyzing an image 53 (FIG. 7) of a laser line 34 projected onto the plies 22a, 22b, and measuring the depth D of the laser line 34 spanning across the gap 28. Although employed to detect and measure the gaps 28 between plies 22a, 22b, the system 35 may also be employed to detect ply boundaries for other purposes, such as to determine whether they are offset 32 (FIG. 2) relative to each other a desired distance.

The system 35 broadly comprises a laser projector 42 and an imaging system 44, both operated by a controller 74. The controller 74 may be a PC (personal computer) or one or more processor, and functions to control and coordinate the operation of the laser projector 42 and imaging system 44 based on a set of instructions the form of software programs 80. One or more memories 76 coupled with the controller 74 is configured to store image data as well as CAD files that define the parts being laid up, including ply schedules and related ply position tolerances.

The laser projector 42 projects a laser beam onto and across the surface (33) of the plies 22a, 22b, forming a laser line 34 on the surface 33 of the plies that traverses across boundaries between the plies 22a, 22b where they are intended to abut. In the illustrated example, the edges 26 of the two plies 22a, 22b are intended to abut each other, however in this example, they are spaced apart from each other to form a gap 28 having a width W. The laser projector 42 has a field of view 38 that is sufficient to span any gap 28 that may be present the two plies 22a, 22b. However in some examples, it may be necessary or desirable to employ two or more laser projectors 42 arranged side-by-side in order to cover a wider area or multiple plies 22 arranged side-by-side.

Figure 5:
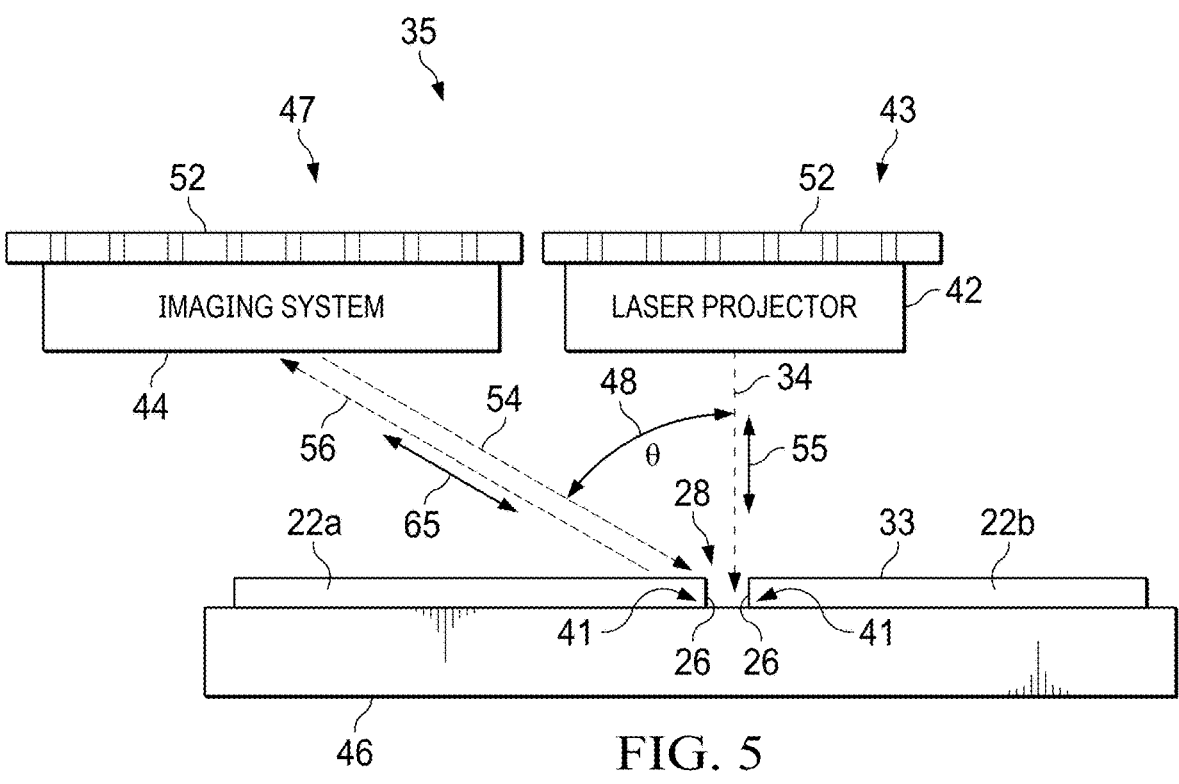
FIG. 5 is an illustration of a diagrammatic view showing how the system employs parallax to detect ply boundaries and measure the gap shown in FIG. 4.
Figure 5A:
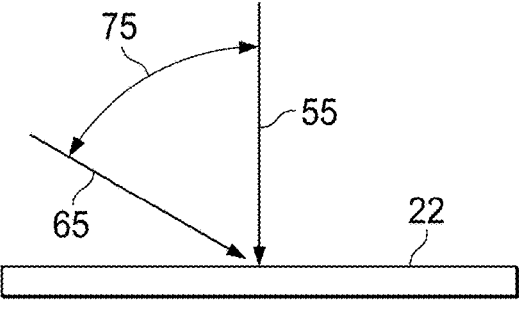
FIG. 5A is illustration of a diagrammatic view showing parallax.

The laser projector 42 and the imaging system 44 are each mounted in fixed positions above the plies 22a, 22b on a ceiling or gantry 52, and therefore remain stationary relative to the plies 22a, 22b. Consequently, projection of the laser line 34 by the laser projector 42, and recording of the image 53 by the imaging system 44 are performed from fixed positions. However, although not necessary, in other examples, either or both the laser projector 42 and imaging system 44 may be mounted on movable platforms such as manipulators (not shown). As will be discussed below in more detail, the imaging system 44 is angularly offset 48 (FIG. 5) by a desired angle θ relative to the laser projector 42, creating parallax 75 (FIG. 5A) between the direction 55 from which the laser line 34 is projected onto the plies 22a, 22b, and the direction 65 from which the imaging system 44 views the area illuminated by the laser line 34. This angular difference, which can be referred to as the parallax angle θ, allows the imaging system 44 to view the area illuminated by the laser projector 42 from a perspective different than that which would be viewed from the perspective of the laser projector 42.

Figure 7:
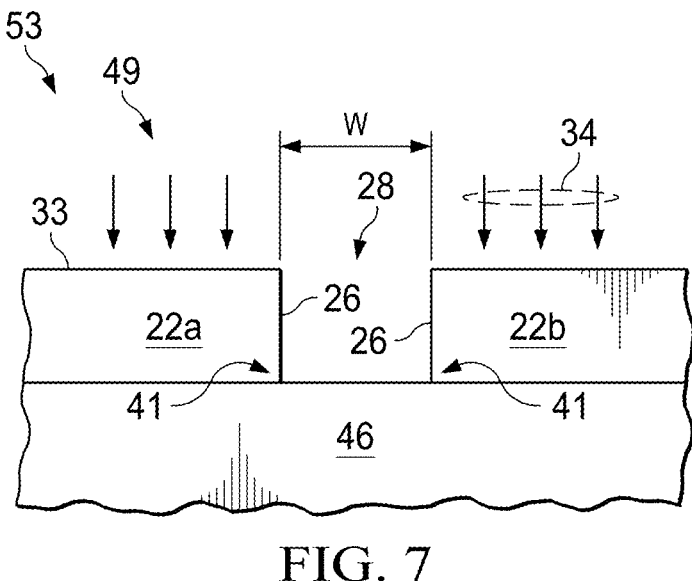
FIG. 7 is an illustration of a fragmentary, sectional view showing part of the image recorded by the imaging system of FIGS. 4 and 5.
Figure 8:
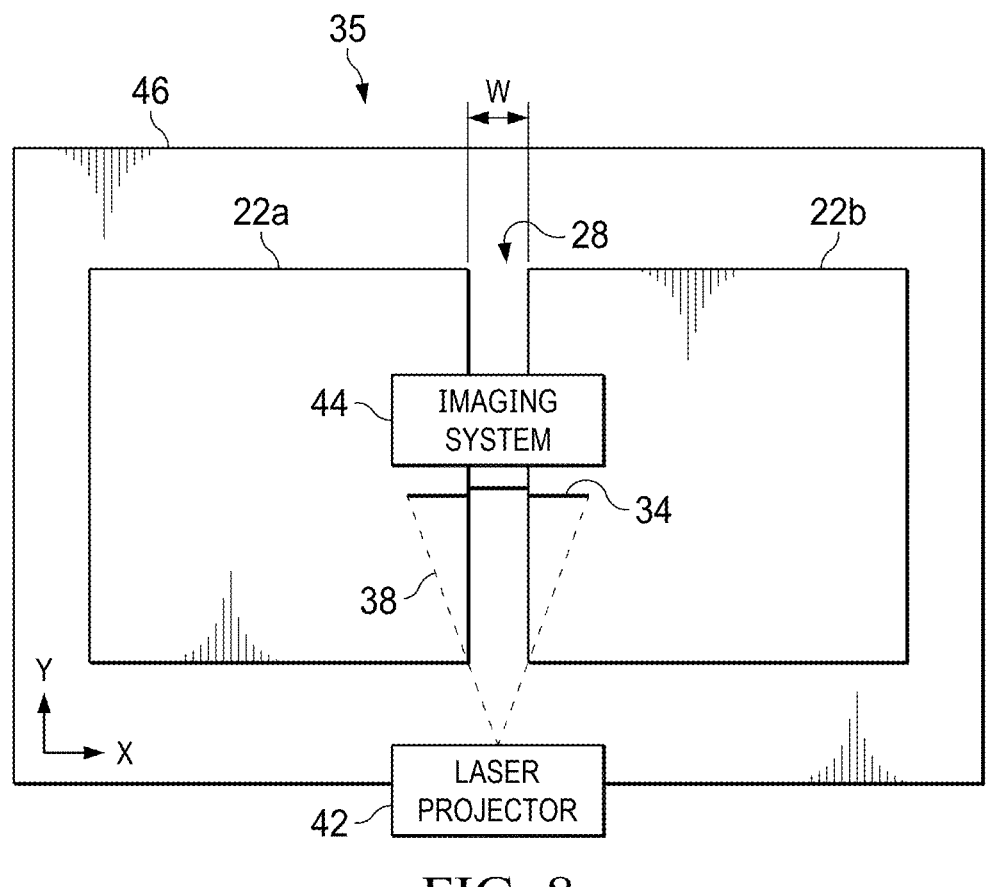
FIG. 8 is an illustration of a diagrammatic, top plan view of another example of the system.

As a result, as shown in FIG. 7, the imaging system 44 images an angular view or profile 49 of the plies 22a 22b which clearly demarcates the edges 26 of the plies 22a, 22b. By knowing where the edges 26 of the two plies 22a, 22b are located in the image 53, measurement of the width W of the gap 28 is made possible. Likewise, the location of an edge 26 allows calculation of this location relative to a reference point, such as the edge 26 of another one of the plies 22. A number of arrangements of the laser projector 42 relative to the imaging system 44 are possible providing that parallax 75 exists between the laser projector 42 and the imaging system 44 allow the profile 49 of an edge 26 to be viewed. In other words, the perspective from which the plies 22 are imaged is different than the perspective from which they are illuminated by the laser projector 42. FIG. 8 illustrates another example in which the parallax 75 is created by angularly offsetting the laser projector 42 along the side of the plies 22a, 22b, while the imaging system 44 is located directly above the plies 22a, 22b.

Figure 6:
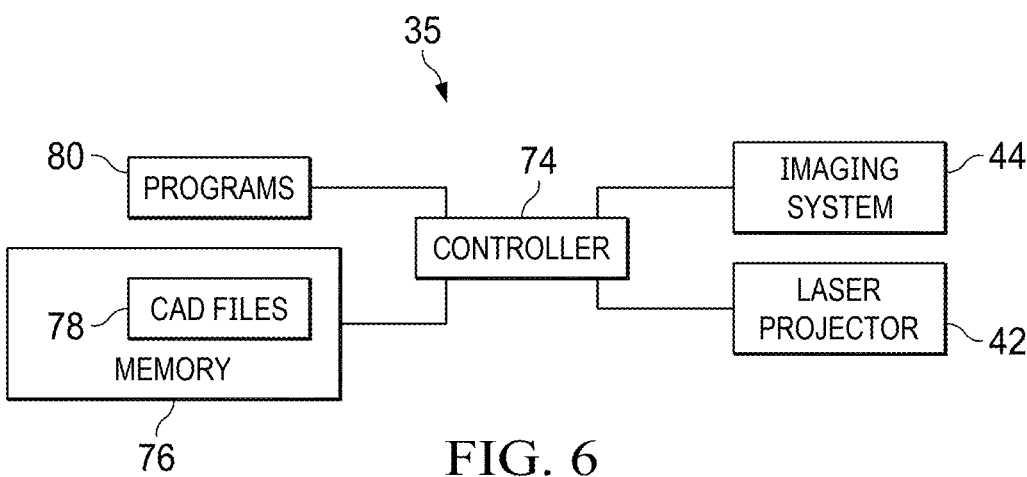
FIG. 6 is an illustration of a block diagram showing functional components of the system.
Figure 9:
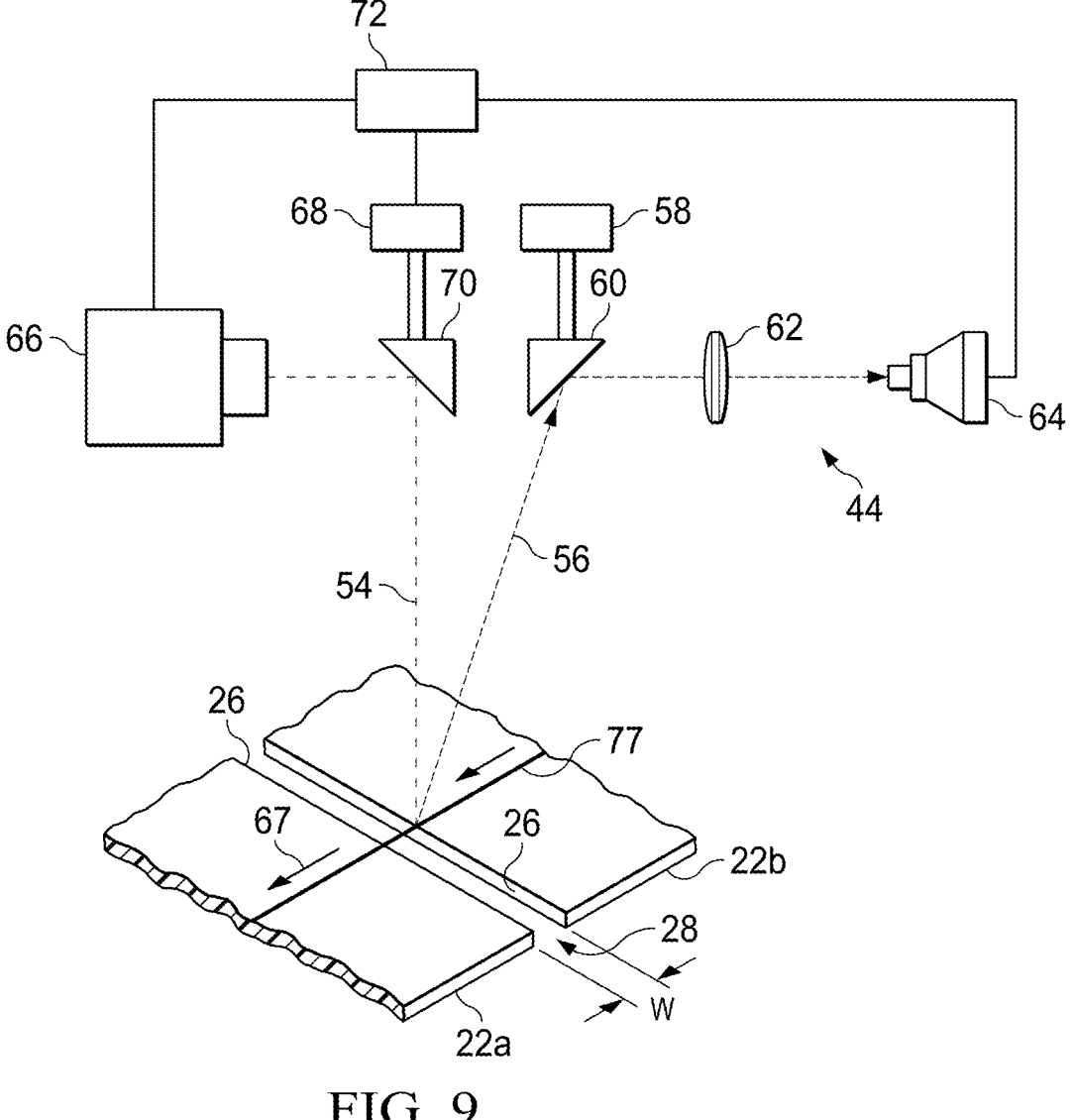
FIG. 9 is an illustration of a combined block and diagrammatic view showing further details of the imaging system shown in FIGS. 4, 5 and 6.

Attention is now directed to FIG. 9 which illustrates one example of an imaging system 44 that can be used to determine ply boundaries, and particularly the location of edges 26. Any of various procedures can be used to register the tool 46 (FIG. 1), and thereby establish the position of the imaging system 44 relative to the tool 46. For example, reflective markers (not shown) can be placed on the tool 46 which then act as the tool's datums that are detected by the imaging system 44 and used to locate the tool 46 in three-dimensional space. The imaging system 44 broadly comprises a laser 66 for scanning 67 a laser beam 54 over a substrate, such as across a gap 28 between two plies 22a, 22b, and a camera 64 that images light reflected from the substrate. The laser 66 directs a laser beam 54 onto a moving mirror 70 controlled by a galvanometer 68 that rapidly scans 67 the laser beam 54 across the substrate such that the light 56 reflected from the substrate is imaged as a single, continuous line 77. The laser 66 and galvanometer 68 are operated by a suitable local controller 72 or by the controller 74 (FIG. 6). The continuous line 77 of light 56 reflected from the plies 22a, 22b is directed onto a mirror 60 operated by a galvanometer 58 also controlled by the controller 74. The mirror 60 images light through a lens 62 onto the camera 64 of the solid-state type which records an image 53 of the surface of plies 22a, 22b that is three dimensional, and particularly the locations of the edges 26, similar to the image 53 shown in FIG. 7. The detected locations of the edges 26 can then be used to measure the width W of any gap 28 that may exist between the plies 22a, 22b and/or to compare the detected locations of the edges 26 with nominal locations such as those derived from CAD files 78 or other data files or information stored in the memory 76 (FIG. 6), and thereby determine whether one of the plies 22 has been accurately placed.

Figure 10:
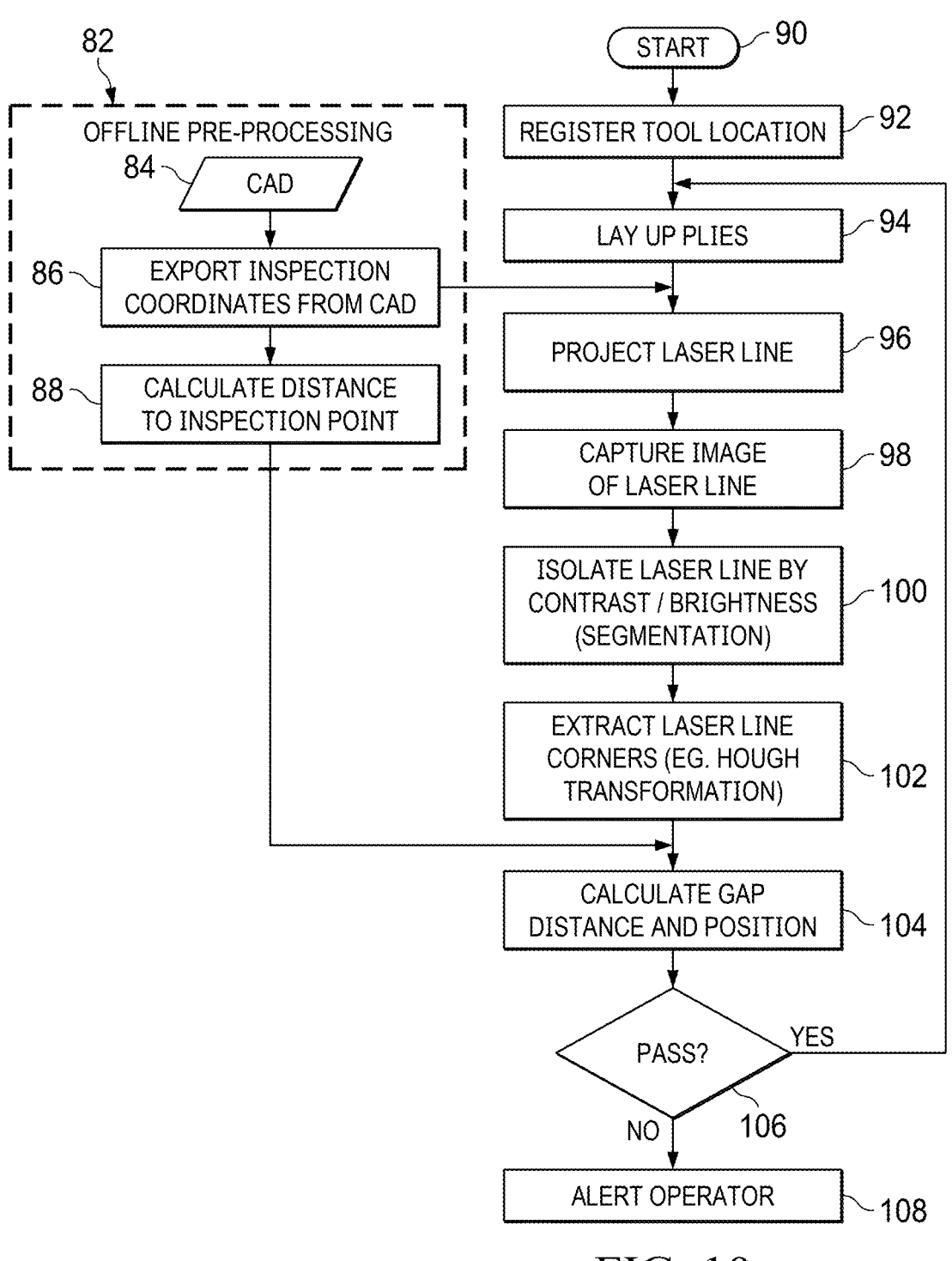
FIG. 10 is an illustration of a flow diagram of a method of detecting ply boundaries and measuring gaps between plies.

Attention is now directed to FIG. 10 which illustrates both the method and an algorithm that can be in implemented through software for determining the location of ply boundaries, and more particularly determining the presence and width of a gap between two plies 22a, 22b. Part of the process is performed in pre-processing 82 that is performed off-line. CAD data 84 contained in CAD files 78 (FIG. 6) specify where the plies 22 are to be placed, including nominal locations of edges 26, as well as the nominal width of a gap that may exist between two plies 22. The CAD data 84 also specifies a nominal ply gap in those applications where plies are intended to abut each other. Next, at 86, the CAD data 84 is exported in a desired format such as inspection coordinates or text, and this information is used by the laser projector to project a laser line at 96 onto the plies 22. Also during pre-processing 82, at 88, the distance between both the laser projector 42 and the imaging system 44 can be calculated from the image 53, and the points on one of the plies 22 that are to be measured. In the present example, since the locations of both the laser projector and the imaging system are fixed, these distances and be easily measured.

Having completed the pre-processing 82 carried out off-line, the process starts at 90 and the location of a tool 46 (FIG. 4) on which the plies 22 are to be laid up is registered. Then at 94, plies 22 are laid up on the tool 46 either by hand or through automated ply placement equipment (not shown). At 96, the laser projector 42 then projects a laser line 34 onto the plies 22 based on the coordinates exported 86 and derived from the CAD data at 84. At 98, the camera 64 which forms part of the imaging system 44 is aimed over the area of the laser line 34 of the laser line 34 are recorded which may appear similar to FIG. 7. After capturing the image at 98, the laser line is isolated at 100 using conventional computer vision techniques which are based on contrast between the laser line 34 and the dark background of the plies 22. After isolating the laser line 34 in the image 53, corner points of the laser line 34 are determined at 102 using a feature extraction technique such as a Hough transform (HT). Knowing the location of the corners of the laser line 34, as well as the distance to the laser line calculated during preprocessing 88, the position and width W of a gap 28 can be calculated at 104. At 106, the calculated gap with W is compared with the nominal gap width. In other words, the measured boundaries of the plies 22a, 22b are compared with the derived from the CAD data 84. If the measured (calculated) gap width W is found to be within tolerance values, then the inspection passes the inspection test, and the next ply is laid up at 94. If, however, inspection does not pass, then at 108 either an operator is alerted and/or modifications are made to the layout process or automated lay of equipment.

The disclosed method and system described above can be implemented to determine ply boundaries and gaps between plies in a variety of applications. For example, referring to FIG. 11, multiple laser projectors 42, 42a and an imaging system 44 can be used to measure the multiple gaps 28 between several plies 22a, 22b, 22c. The disclosed method and system can also be used to determine ply boundaries and measure gaps between plies 22 on a curved surface, such as the curved tool 46a shown in FIG. 12. In this example, multiple laser projectors 42, 42a and imaging systems 44, 44a can be fixed on a common mount (not shown) that is rotated 110 as needed to determine ply boundaries and/or measure gaps between plies 22 laid up on the curved tool 46a. Another implementation of the system is shown in FIG. 13 in which matched sets of laser projectors 42, 42a and imaging systems 44, 44a can be used to determine ply boundaries and/or measure gaps between plies arranged along a tool 46 or production line.

FIG. 14 broadly illustrates the overall steps of the method of detecting the edges 26 of one of the plies 22, such as the edges 26 of a layup 20. At 112, a laser line 34 is projected from a first position 43 onto the surface 33 of the plies 22. The laser line 34 spans across an edge 26 of the plies 22. At 114, an image 53 of the laser line 34 is recorded from a second position 47 that is angularly offset 48 from the first position 43, resulting in the creation of parallax 75. At 116, the location of the edge 26 of the plies 22 is determined based on the image 53 recorded of the laser line 34.

FIG. 15 broadly illustrates the overall steps of a method of measuring a gap 28 between two plies 22*a*, 22*b*. At 118, a laser line 34 is projected from a laser projector 42 in a first position 43 onto ply 22*a* and ply 22*b* spanning across the gap 28. At 120, an image 53 of the laser line 34 is recorded from a second position 47 that is angularly offset 48 from the first position 43. At 122, the location of edges 26 of ply 22*a* and ply 22*b* are detected using the recorded image 53 of the laser line 34. At 124, the width W of the gap 28 are determined based upon the detected locations of the edges 26.

Examples of the disclosure may find use in a variety of potential applications, particularly in the transportation industry, including for example, aerospace, marine, automotive applications and other application where sheets and pies such as composite plies are laid up must be positioned relative to each other. Thus, referring now to FIGS. 21 and 22, examples of the disclosure may be used in the context of an aircraft manufacturing and service method 126 as shown in FIG. 21 and an aircraft 128 as shown in FIG. 22. Aircraft applications of the disclosed examples may include a variety of composite laminate parts. During pre-production, the service method 126 may include specification and design 130 of the aircraft 128 and material procurement 132. During production, component and subassembly manufacturing 134 and system integration 136 of the aircraft 128 takes place. Thereafter, the aircraft 128 may go through certification and delivery 138 in order to be placed in service 140. While in service by a customer, the aircraft 128 is scheduled for routine maintenance and service 142 which may also include modification, reconfiguration, refurbishment, and so on.

Each of the processes of service method 126 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 22, the aircraft 128 produced by service method 126 may include an airframe 144 with a plurality of high-level systems 146 and an interior 148. Examples of high-level systems 146 include one or more of a propulsion system 150, an electrical system 152, a hydraulic system 154 and an environmental system 156. Any number of other systems may be included. Although an aerospace example is shown, the principles of the disclosure may be applied to other industries, such as the marine and automotive industries.

Systems and methods embodied herein may be employed during any one or more of the stages of the aircraft manufacturing and service method 126. For example, components or subassemblies corresponding to component and subassembly manufacturing 134 may be fabricated or manufactured in a manner similar to components or subassemblies produced while the aircraft 128 is in service. Also, one or more apparatus examples, method examples, or a combination thereof may be utilized during the component and subassembly manufacturing 134 and system integration 136, for example, by substantially expediting assembly of or reducing the cost of an aircraft 128. Similarly, one or more of apparatus examples, method examples, or a combination thereof may be utilized while the aircraft 128 is in service, for example and without limitation, to maintenance and service 142.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different advantages as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method of detecting edges of a ply, the method comprising:
   projecting, from a first position onto a surface of the ply, a laser line spanning across an edge of the ply;
   scanning the laser line on the first ply with a galvanometer;
   recording, from a second position angularly offset from the first position, an image of the laser line; and
   determining, using the image of the laser line, a location of the edge of the ply.

2. The method of claim 1, wherein projecting the laser line is performed using a laser projector.

3. The method of claim 1, wherein recording an image of the laser line includes:
   imaging light reflected from the surface of the ply onto a camera.

4. The method of claim 3, wherein scanning a laser beam includes:
   generating a laser beam.

5. The method of claim 4, wherein projecting the laser line and recording an image of the laser line are performed from fixed positions.

6. The method of claim 1, wherein:
   recording the image of the laser line includes generating a profile of the laser line, and
   determining the location of the edge includes detecting a change in the profile.

7. The method of claim 1, further comprising:
   storing a set of data defining a desired, nominal location of the edge of the ply; and
   comparing the location of the edge of the ply based on the image of the laser line with the nominal location.

8. The method of claim 1, wherein determining the location of the edge includes:
   isolating the laser line in the image based on contrast between the laser line and the ply.

9. The method of claim 1, wherein:
   recording the image of the laser line includes recording a profile of the edge, and
   determining the location of the edge includes measuring a depth of the edge.

10. A method of measuring a gap between a first ply and a second ply, the method comprising:

projecting a laser line from a laser projector in a first position onto the first ply and the second ply spanning the gap;

scanning the laser line on the first ply and the second ply with a galvanometer;

recording an image of the laser line from a second position angularly offset from the first position;

detecting a location of edges of the first ply and the second ply using the image; and determining a width of the gap based on the location of the edges.

11. The method of claim 10, wherein each of the first position and the second position are fixed relative to the first ply and the second ply.

12. The method of claim 10, wherein the first position and the second position are angularly offset from each other by a parallax angle.

13. The method of claim 10, wherein recording an image of the laser line includes:

generating a laser beam.

14. The method of claim 10, wherein:

recording the image of the laser line includes generating a profile of the laser line, and detecting a location of the edges includes detecting a change in the profile.

15. The method of claim 10, wherein detecting a location of the edges includes measuring a depth of the laser line spanning across the gap.

16. The method of claim 10, further comprising:

storing a set of data defining a desired, nominal width of the gap; and comparing the width of the gap with the desired, nominal width.

17. The method of claim 10, wherein detecting a location of the edges includes isolating the laser line in the image based on contrast between the laser line and the first ply and the second ply.

18. A system configured to detect a location of an edge of a ply, wherein the system comprises:

a laser projector configured to project a laser line onto the ply;

a galvanometer configured to scan the laser line on the ply; and an imaging system angularly offset from the laser projector by a parallax angle.

19. The system of claim 18, wherein each of the laser projector and the imaging system is mounted in a fixed position relative to the ply.

20. The system of claim 18, wherein the imaging system includes:

a camera configured to recorded images; and a second galvanometer configured to direct light into the camera that is reflected from the ply and originates from the laser beam.

21. The system of claim 18, further comprising:

a controller configured to coordinate operation of the laser projector with the imaging system.

22. The system of claim 21, further comprising:

a memory coupled with the controller and configured to store image data representing a desired, nominal location of the edge of the ply.

* * * * *